United States Patent [19]

Smith

[11] 4,011,679
[45] Mar. 15, 1977

[54] SPRING BIASED FISH HOOK SETTER
[76] Inventor: Melvin L. Smith, 12902 E. Sprague Ave., Spokane, Wash. 99216
[22] Filed: Jan. 10, 1974
[21] Appl. No.: 432,407
[52] U.S. Cl. .................................................. 43/15
[51] Int. Cl.² ..................................... A01K 97/00
[58] Field of Search ....................................... 43/15
[56] References Cited
UNITED STATES PATENTS
2,589,533   3/1952   Buchner ............................... 43/15

*Primary Examiner*—Louis G. Mancene
*Assistant Examiner*—Daniel J. Leach

[57] ABSTRACT

An in line fishhook setting device having manually settable spring biasing means maintained in an extended set position by a setting hook until activated by a fish to release the biasing means. The setting hook rotates from a normally biased position to set upon spring extension thereby preventing resetting of the device by a hooked fish.

1 Claim, 4 Drawing Figures

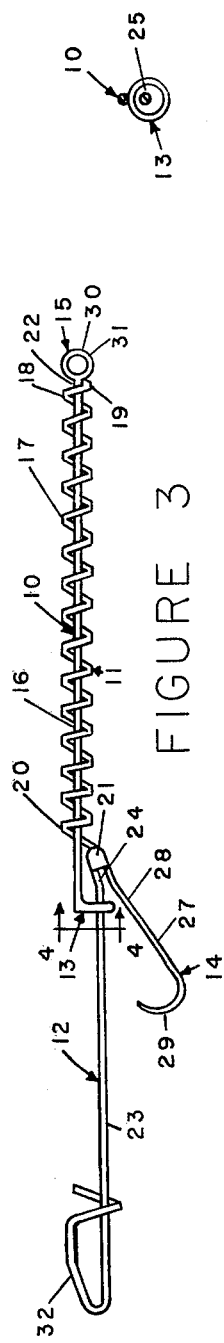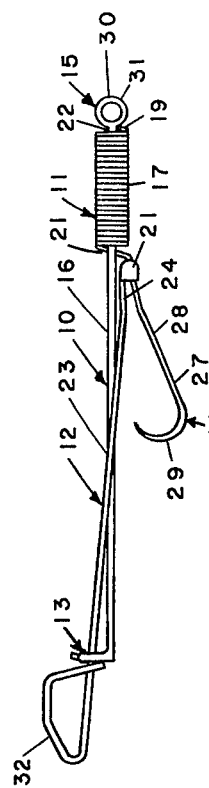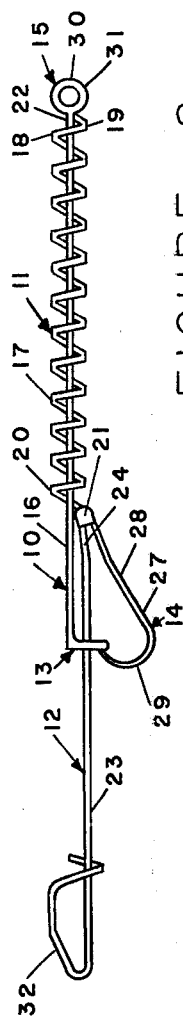

4,011,679

SPRING BIASED FISH HOOK SETTER

BACKGROUND OF INVENTION

1. Field of Invention

My invention relates in general to fishhook setters and in particular to such devices that are spring biased for activation by a fish but not resettable by it.

2. Description of Prior Art

My invention provides both a fish snubber and a hook setting device. The principles of each are known generally in the prior art but the instant invention provides improvements over that prior art.

Snubbing devices are inserted in fishing lines to prevent a hooked fish from unsetting the hook. Most provide a resilient elastic linkage of some sort to absorb shock and alternate line tension caused by the hooked fish. The snubbing feature per se is not a part of my invention, except as to its existence in the hook setting device.

Some fishhook setting devices known in the prior art function on the same principle and appear physically similar to the instant invention. My invention differs from the prior art, however, in particular structure which prevents resetting of the device by movement of a hooked fish after the device has been triggered. This particular structure provides spring connected guide rods angled slightly relative to one another by connection to diagonally opposed ends of a coil spring so that upon spring extension the rod carrying one portion of the latching device may rotate ninety degrees against bias to engage a latching device, thereby making inadvertent re-engagement practically impossible. Prior art devices of the same type generally provide substantially parallel guide rods each carrying a latching device so that certain combinations of pulling and bending forces will allow the latching device to be reset by the actions of a hooked fish. Resetting of the latching device or a subsequent re-release quite often manipulates a serviced fishhook in a manner that will cause the fish to become unhooked. Since my invention will not allow such inadvertent resetting once the device is triggered, this distinguishes my invention from the prior art. My device also provides a smoother action, lower probability of fouling and simpler construction of greater durability that prior art devices.

SUMMARY OF INVENTION

I provide a coil spring joined at the forward or upper end to a first elongate rod which passes back through the center of the spring to extend therepast a distance equal to the length the spring must be extended to provide the desired setting force. A rod guide extends perpendicularly from the rearward or lower end of the first rod to slideably carry a second rod shorter than the first rod by the length of the relaxed spring. The upper end of the second rod is joined to the lower end of the coil spring at a point diagonally opposed to the joinder of the first rod so that the second rod depends downward angularly to the first rod and crossing over it near its mid-point. A hook is joined to the upper extremity of the second rod extending outwardly and downwardly with its open end facing inwardly. The hook opening faces the same direction as the rod guides when the spring is in a relaxed position. Eyes are provided at the upper extremity of the first rod and lower extremity of the second rod for attachment in a fishing line.

To set the device, the coil spring is manually extended and the hook simultaneously rotated one hundred eighty degrees to position the fastening hook opposite the rod guide to allow insertion of the hook into a hook hole in the guide so that the spring is thereby releasably maintained in extended position. When a fish pulls on the second rod and attached hook with sufficient force to further extend the spring, the hook is pulled out of the guide rod to allow the guide rod to release the spring bias to aid in hooking the activating fish.

It is to be noted that if a fish should, after being hooked, pull with a sufficient force to allow resetting of the device it will nevertheless not be reset thereby as the hook and rod guide are then facing in opposite directions. In order to set my invention the setting hook must be rotated while the spring is extended.

In providing such a device it is:

A principal object of my invention to create a novel in line setting device that is also a spring biased uniformly reusable snubber.

A further object of my invention to provide such a device that may not be inadvertently reset when pulled in any conceivable manner by a hooked fish.

A further object of my invention is to provide such a device that will flex and yet operate freely without undue binding or fouling irrespective of bending of the rod elements therein by a hooked fish.

A still further object of my invention to provide such a device that is of new and novel design, of rugged and durable nature, of simple and economic manufacture and one otherwise well adapted to the uses and purposes for which it is intended.

Other and further objects of my invention will appear from the following specification and accompanying drawings which form a part hereof. In carrying out the objects of my invention, however, it is to be understood that its essential features are susceptible of change in design, and structural arrangement with only one preferred and practical embodiment being set forth in the accompanying drawings as required.

BRIEF DESCRIPTION OF DRAWINGS

In the accompanying drawings which form a part hereof and wherein like numbers of reference refer to similar parts throughout:

FIG. 1 is an orthographic plan view of my invention in an unset or relaxed mode showing its elements, their configuration and relationship.

FIG. 2 is an orthographic plan view of my invention similar to that of FIG. 1 but in a set mode.

FIG. 3 is an orthographic plan view of my invention similar to that of FIG. 1 but with the spring fully extended, as might occur with a hooked fish.

FIG. 4 is a cross-sectional view showing my rod guide and the relationship of the rods thereto, taken on the line 4—4 of FIG. 3 in the direction indicated by the arrows.

DESCRIPTION OF THE PREFERRED EMBODIMENT

Referring now to the drawings in more detail, it will there be seen that my invention comprises generally a first rod 10 joined at one end to biasing spring 11, a second rod 12 joined to the other end of the biasing spring and passing through a guide 13 sideably joining the two rods, and a setting hook 14 carried by the spring end of the second rod 12 to contact the guide to maintain the spring in an extended or set mode.

First rod 10 is an elongate cylindrical element 16 formed from resilient corrosion resistant material, such as in the instance illustrated, 0 gauge stainless steel wire. The particular material is not critical, however, so long as it be available in thin rods having sufficient tensile strength to withstand the forces exerted by a hooked fish, sufficient resiliency to maintain its configuration in relation to other elements and sufficient flexibility to allow some bending when subject to non-linear forces. The length of the rod element should be greater than the extended length of the biasing spring in its extreme extended position. Attachment eye 30 defined by ring 31 is fastened to the first rod at or near its attachment to the setting spring to provide means at the upper end of my device for fastening the device in a fishing line.

Biasing spring 11 is a commercially available helically wound cylindrical coil spring 17 having a wire diameter slightly smaller than rod 10 and defining an internal channel to slideably receive first rod 10 therein. The spring tension and extensions will vary somewhat with the material characteristic and species of fish for which a particular device is intended. A spring approximately one and one-half inches long when compressed which will extend to two and one-half inches with a pulling force of a few ounces is desirable for small trout, perch and the like. The uppermost part 18 of spring 11 ("uppermost" as determined from normal fishing position) is bent upward and inward to form a vertical portion for joinder, in this instance silver solder, to upper extremity 22 of first rod 10 so that this rod extends downwardly through the spring. The lowermost part 20 of the spring is similarly bent inwardly and downwardly to form portion 21 adapted for connection of the second rod 12 and setting hook 14.

Second rod 12 is an elongate cylindrical element 23 of the same material as first rod 10. It is somewhat shorter than the first rod, however, in this instance only about one-half as long. The upper extremity 24 of rod 12 is structurally joined to portion 21 of spring 11, again preferably by means of silver solder. The second rod is joined substantially on the spring center line and depends downwardly at an angle relative to first rod 10, crossing it about midpoint all as illustrated in FIG. 1.

The lower part 34 of the second rod provides fastener 32 to releasably connect the device to a fishing line; the type of fastener is not critical and may be a ring or snap as illustrated.

Annular rod guide 13 defines eye 25 of a diameter larger than the first rod 10 to allow a sliding fit thereover. The rod guide is formed from the same material as the rods and is joined by the periphery perpendicularly thereto fastened at the lower extremity 16 of rod 10, again preferably by means of silver solder. The guide is oriented so that its eye is disposed towards second rod 12 which passes therethrough. Setting hook 14 is formed of similar wire material as the rods to provide an inwardly facing J shaped hook element 27 which is joined with upper extremity 24 of second rod 12 to spring bottom portion 21 by leg 28. This leg depends angularly away from rod 12 in a direction one hundred eighty degrees opposed from the direction guide 13 faces when the elements are in relaxed mode. Hook portion 29 turns inward towards rod 12 terminating substantially vertically and displaced from rod 12 by a short distance, approximately one-half inch in the instance illustrated.

Having thusly described my invention, its operation may now be understood.

Firstly, the device is formed according to the foregoing specifications of approximate dimensions and configuration illustrated and with spring tension and extension adapted for the species of fish to be caught. Upper eye 30 is joined to the pole connected portion of a fishing line (not shown) and lower snap fastener 32 is attached to the hook carrying line or leader (not shown).

The device is manually set by holding the upper eye 30 or rod guide 13 immobile while pulling hook 14 or lower eye 32 downward against the tension of spring 11 while simultaneously rotating one rod one hundred eighty degrees relative the other rod so that setting hook 14 aligns with rod guide 13 to allow passage of curved portion 29 through the rod guide eye to lock the device in this configuration with the biasing spring extended, all as illustrated in FIG. 2. Fishing is then commenced in the normal manner dependent upon ambient conditions and fish species.

When a fish disturbs the hook connected to the lower end of the device with sufficient force hook 14 is lifted from rod guide 13 and the biasing spring contracts, thereby moving lower eye 32 and consequentially the connected hook rapidly away from the fish causing setting of the hook in the normal fashion if it be appropriately in the fish's alimentary canal at the time of the triggering. Upon release of setting hook 14, rod guide 13 rotates one hundred eighty degrees relative the setting hook to its normal unbiased mode making re-setting of the device by the fish impossible. As noted, this rotational movement due to its suddenness is transmitted to some degree to the hook causing further chance of successful hooking, particularly when used with a multiple hook.

The fish is then played and landed in a normal manner during which the spring acts as a snubbing device attenuating the sudden movements by either fish or angler to reduce the probability of loss of a fish by unhooking or line breakage. With my hook setter such movement of fish or angler subsequent to fish hooking cannot reset the device even if enough force is present to extend the spring a sufficient distance since the hook and guide bar are not co-planar when in relaxed mode but must be physically rotated in order to achieve the alignment required for setting.

It is also to be noted that while playing a hooked fish the use of a single guide rod for support of the rod, which moves during spring deflection, will not cause binding irrespective of angular location of the fish relative the device or bending of the device.

It is to be noted that while my device is probably most effective for still fishing, it can be used for trolling, casting or other fishing techniques. The device works equally well with any type of lure or motion imparting device known in the piscatorial arts.

The foregoing description of my invention is necessarily of a detailed nature so that a specific embodiment of it might be set forth as required but it is to be understood that various modifications of detail rearrangement and multiplication of parts may be resorted to without departing from its spirit, essence or scope.

Having thusly described my invention, what I desire to protect by Letters Patent, and what I claim is:

1. A spring biased fishhook setting device, comprising, in combination:
   an extension type biasing spring defining an elongate central channel;
   an elongate resilient first rod structurally joined to the first end of the biasing spring, having means for attachment of a fishing line at the end of joinder to the spring, extending through the central channel of the spring and a predetermined distance therebeyond to carry a substantially perpendicularly extending rod guide defining a central eye at a spaced distance from the first rod;
   an elongate resilient second rod structurally joined to the second end of the biasing spring and extending in substantially axial alignment away therefrom in the same direction as the first rod, to pass through and be slideably carried in the central eye of the rod guide, and to extend therebeyond to carry means of attaching a fishing line thereto; and
   a J-shaped setting hook structurally carried by the second end of the biasing spring to extend away from the spring and toward the rod guide with the open hook element oriented in the same direction as the extension of the rod guide from the first rod, said hook being manually movable against both lineal and rotary spring bias to releasably hook into the central eye of the rod guide and be released therefrom by predetermined tension force between the two line fastening means.

* * * * *